May 17, 1960  A. J. LECHNER ET AL  2,936,773
FLUID DRAIN VALVE
Filed Jan. 25, 1957

*INVENTORS*
ALBERT J. LECHNER
GUILFORD W. LOUTHAN
By George C. Sullivan
Agent

United States Patent Office 2,936,773
Patented May 17, 1960

2,936,773

FLUID DRAIN VALVE

Albert J. Lechner, North Hollywood, and Guilford W. Louthan, Van Nuys, Calif., assignors to Lockheed Aircraft Corporation, Burbank, Calif.

Application January 25, 1957, Serial No. 636,426

9 Claims. (Cl. 137—204)

This invention relates generally to fluid flow control valves and more particularly to an automatic fluid drain valve for pressurized enclosures such as the fuselage of aircraft.

In sealing off an enclosure to provide an efficient pressure vessel, fluid leakage from equipment carried inside the enclosure and moisture produced by condensation are trapped and must be periodically drained. This is conventionally done in aircraft, for example, through the use of manually operated drain valves. If the ground crew fails to open the drain valve periodically, the waste fluids are retained in the aircraft. If the ground crew fails to close the drain valve the pressurization system is overworked due to air leakage through the valve opening. Thus, a drain valve which will automatically close in response to pressurization of the enclosure and which will automatically open when the enclosure is depressurized offers many advantages over a drain valve of the manual type. However, an automatic fluid drain valve suitable for use in a pressurized enclosure such as the fuselage of an aircraft must meet certain standards of performance not required of a manual valve. The valve must be light in weight and above all, dependable in operation. The working parts of the valve should be protected so that damage will not result from personnel stepping on the valve or dropping cargo thereon. The valve should have a high flow rate and permit access of fluids to the drain hole from substantially all directions for complete drainage. Furthermore, valve actuation must be effected at a pressure differential which is less than that at which the pressurized enclosure is intended to operate. In aircraft usage, the drain valve should be actuated in response to a pressure differential of approximately one p.s.i. or less.

It is an object of this invention to provide a drain valve for pressurized enclosures which will automatically close in response to pressurizing the enclosure and automatically open in response to depressurizing the enclosure. By proper design of the disclosed valve construction, valve actuation may be effected at differential pressures of the order of 0.5 p.s.i.

Another object of this invention is to provide an automatic fluid drain valve which is constructed to utilize the valve supporting structure for guarding the working parts of the valve and to provide a high flow rate with maximum access of fluids to the drain hole.

Another object of this invention is to provide an automatic fluid drain valve which may be economically produced and easily installed and maintained.

Still another object of this invention is to provide an automatic fluid drain valve which is dependable in operation and which will substantially eliminate leakage through the drain hole at all differential pressures above that required for valve closure.

Further and other objects will become apparent from a reading of the following description especially when considered in combination with the accompanying drawing wherein like numerals refer to like parts.

Figure 1:
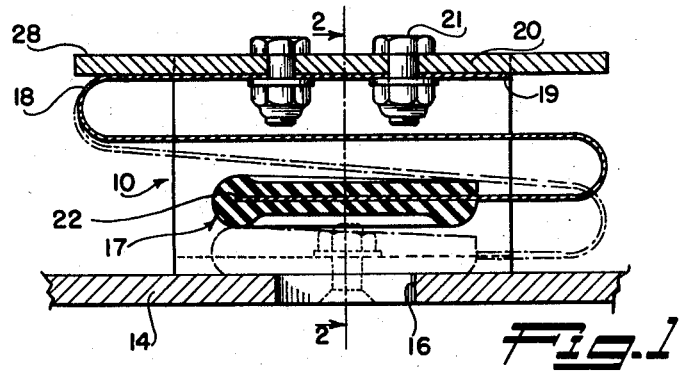
Figure 1 is a sectional side view of the automatic fluid drain valve.
Figure 2:
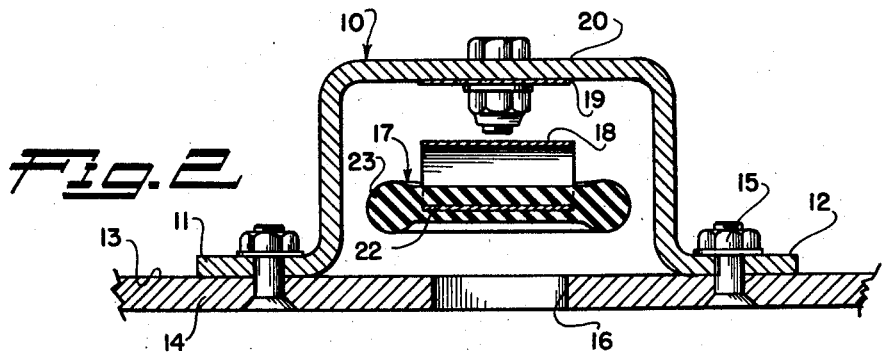
Figure 2 is a sectional view taken on line 2—2 of Figure 1.

Referring to Figures 1 and 2 the valve inccludes a generally U-shaped bracket 10 having flanges 11 and 12 which seat against the inner surface 13 of wall member 14, the latter representing a pressurized enclosure such as the fuselage of an aircraft. Bracket 10 is suitably secured interiorly of the enclosure such as by bolts 15 extending through wall member 14 and flanges 11 and 12.

Bracket 10 spans an opening 16 formed in enclosure wall member 14 and yieldingly supports a resilient sealing element or disk 17 generally concentric with the opening through the use of a leaf spring 18. The leaf spring, as shown in Figure 1, is secured at one end 19 to the bridge portion 20 of bracket 10 by bolts 21 or the like. Two acute angle bends formed in leaf spring 18 positions the free end 22 of the spring over opening 16 and in a plane generally parallel with the plane of the wall at the opening. Sealing element 17 is suitably secured to free end 22 of spring 18 such as by vulcanizing.

Sealing element 17 may be molded from rubber or any other resilient material which is capable of deforming under the applied pressure when the valve is closed, to effect positive contact with enclosure wall member 14 continuously around the opening.

Bridge portion 20 may extend outwardly forming an overhang 28 on either end of bracket 10 to provide adequate protection for leaf spring 18.

Leaf spring 18 should be at least as wide as opening 16 so that adequate support will be provided for resilient sealing element 17 to prevent the same from warping under the internal pressures effecting closure of the valve. Also the radius of curvature of the acute angle bends in leaf spring 18 should be selected so that sealing element 17 in the open position of the valve is in the neighborhood of ⅛ to ¼ inch from enclosure wall member 14 depending upon the specific design requirements.

The plan form size of sealing element 17 must of course be greater than the plan form size of opening 16 to effectively seal the opening. The cross-sectional shape of sealing element 17 is preferably as shown in Figures 1 and 2 wherein a continuous bead 23 is formed on the outer periphery thereof so that contact with wall member 14 around opening 16 is first made by the bead when the valve closes. This localizes the closing forces and provides high contact pressures around the opening for preventing fluid leakage at low differential pressures.

Figure 3:
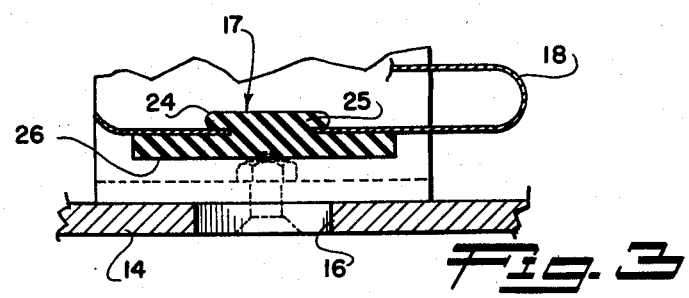
Figure 3 is a fragmentary sectional side view showing a modified form of sealing element for the automatic fluid drain valve.

There are several modifications which may be made to the preferred form of sealing element 17 without departing from the teachings of the invention. One such modification is illustrated in Figure 3 wherein sealing element 17 is secured to the free end of leaf spring 18 by extruding a grommet-like detent 24 on the sealing element through an opening 25 formed in the leaf spring. Furthermore, in the Figure 3 configuration the seating surface 26 of the sealing element is flat with no continuous bead being formed thereon as shown in the configuration of Figures 1 and 2.

Figure 4:
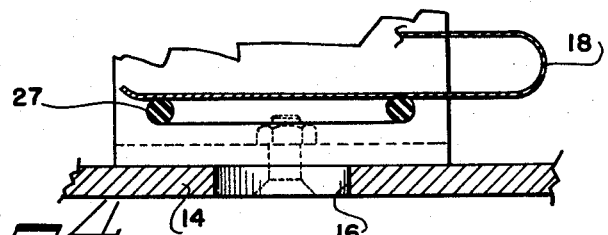
Figure 4 is a fragmentary sectional side view showing still another modified form of sealing element for the automatic fluid drain valve.

A second modification of the sealing element is illustrated in Figure 4 wherein a simple O ring seal 27 is suitably secured to leaf spring 18. With this configuration the diameter of the O ring must be no greater than the width of the leaf spring so that when the O ring is squeezed between enclosure wall member 14 and the leaf spring the opening is completely sealed. In function, O ring 27 is indentical to bead 23 formed on sealing element 17 in Figures 1 and 2.

In operation, when the enclosure is depressurized so that the pressures both inside and outside of the enclosure are substantially equal, sealing element 17 is suspended above opening 16 by spring 18 allowing any waste fluid within the enclosure to drain through opening 16. When the enclosure is pressurized so that the internal pressure is greater than the external pressure the pressurizing fluid starts to flow through opening 16 creating a pressure drop by venturi action which is added to the normal pressure differential existing between the inside and the outside of the enclosure. By the proper selection of leaf spring 18 and by supporting sealing element 17 approximately 1/8 to 1/4 inch from wall member 14 of the enclosure, actuation of the valve to close opening 16 may be effected at differential pressures even less than 0.5 p.s.i. As the sealing element is forced into engagement with enclosure wall member 14 as illustrated by dotted lines in Figure 1, the resiliency of the sealing element provides a fluid tight seal even though a poorly mating seating surface is provided by wall member 14 and even though solid particles might be caught between the sealing element and its seating surface on the wall member. The higher the differential pressure the greater is the force maintaining the valve closed.

As the differential pressure is decreased, the valve will remain closed until the force exerted by the differential pressure is less than the force exerted by spring 18 tending to raise the sealing element to the open position. This threshold value for the differential pressure is substantially the same or slightly lower than the threshold value of the differential pressure required to close the valve.

Valve operation is substantially the same with any of the three sealing elements shown. Normally the use of a bead or its equivalent has the effect of slightly increasing the differential pressure required to close the valve as compared with a flat sealing element as shown in Figure 3, however, it is substantially more effective in preventing fluid leakage at low pressure differentials due to the higher contact pressure between the sealing element and the seating surface on enclosure wall member 14 around opening 16.

While the preferred embodiment of the valve employs a leaf spring because of its high resistance to movement in all directions except toward and away from the valve opening, it should be understood that other types of springs may be employed within the teachings of the invention. Accordingly, it should be understood that certain alterations, modifications and substitutions such as those suggested hereinabove may be made to the instant disclosure without departing from the spirit scope of the invention as defined by the appended claims.

We claim:

1. In a pressurized enclosure, an automatic fluid drain valve comprising, a wall member serving as a part of the enclosure and having an opening formed therein through which fluid may drain, a bracket secured to the wall member and spanning the opening, a leaf spring secured at one end to said bracket and having at least one acute angle bend therein, the free end of said spring extending transversely over the opening between the bracket and wall member, and a resilient disk generally aligned with the opening and secured to the free end of said spring, said spring supporting said disk spaced from the opening for movement toward the opening in response to a pressure differential whereby the disk is deformably pressed against the wall member sealing the opening only when the enclosure is pressurized.

2. In a pressurized enclosure, an automatic fluid drain valve as defined in claim 1 including a continuous bead secured to the resilient disk generally concentric with the opening for engaging the wall member when the valve is closed.

3. In a pressurized enclosure, an automatic fluid drain valve comprising, a wall member serving as a part of the enclosure and having an opening formed therein through which fluid may drain, a bracket secured to the wall member adjacent the opening, a spring secured at one end to said bracket and extending outwardly therefrom and in the general direction of the opening, the free end of said spring terminating in spaced relation with the opening, and a resilient disk carried on the free end of said spring for movement toward the opening in response to a pressure differential whereby the disk is deformably pressed against the wall member sealing the opening only when the enclosure is pressurized.

4. In a pressurized enclosure, an automatic fluid drain valve as defined in claim 3 including a continuous bead secured to the resilient disk generally concentric with the opening for engaging the wall member when the valve is closed.

5. In an aircraft having a pressurized enclosure, an automatic fluid flow control valve comprising, a wall member serving as a part of the enclosure and having an opening formed therein through which fluid may drain, a bracket secured to the wall member on the inside thereof and spanning said opening, a leaf spring secured at one end to said bracket and having at least one acute angle bend formed therein, the free end of said spring extending transversely over the opening between the bracket and wall member, and a resilient sealing element secured to the free end of said spring and arranged generally concentric with the opening, said spring yieldingly supporting said sealing element spaced from the opening whereby the valve is responsive to pressurization of the enclosure for actuation to close the opening by deformably pressing the disk against the wall member.

6. A device as defined in claim 5 having a continuous bead secured to the sealing element for engaging the wall member around the opening when the valve is closed.

7. In a pressurized enclosure, an automatic fluid drain valve comprising, a wall member serving as a part of the enclosure and having an opening formed therein through which fluid may drain, a resilient sealing element having a platform size greater than the size of the opening, and spring means carried within the enclosure and supporting said sealing element for movement toward and away from the opening in response to a pressure differential whereby the sealing element is deformably pressed against the wall member sealing the opening only when the enclosure is pressurized.

8. In a pressurized enclosure, an automatic fluid drain valve comprising, a wall member serving as part of the enclosure and having an opening formed therein through which fluid may drain, a bracket secured to the wall member and spanning the opening, a leaf spring secured at one end thereof to said bracket, and a resilient sealing element secured to the opposite end of said leaf spring and generally aligned with the opening whereby pressurization of the enclosure effects movement of the sealing element to press against the wall member and deform to mate therewith for closing the opening.

9. In a pressurized enclosure, an automatic fluid drain valve comprising, a wall member serving as part of the enclosure and having an opening formed therein through which fluid may drain, spring means carried within said enclosure and extending in the direction of said opening, a resilient sealing member secured to said spring means substantially in alignment with said opening, said spring means yieldingly supporting said sealing member spaced from the opening whereby the valve is responsive to pressurization of the enclosure for moving the sealing element into engagement with said wall member to deform and mate therewith, and a continuous bead formed on at least one of said members for engaging the other member around said opening when the valve is closed.

References Cited in the file of this patent

UNITED STATES PATENTS

| | | |
|---|---|---|
| 756,869 | Mansfield | Apr. 12, 1904 |
| 978,152 | Gutermuth | Dec. 13, 1910 |
| 2,217,380 | Pedder et al. | Oct. 8, 1940 |
| 2,563,200 | Venning | Aug. 7, 1951 |
| 2,599,622 | Folmsbee | June 10, 1952 |
| 2,655,936 | Wexler et al. | Oct. 20, 1953 |
| 2,719,531 | Sogge | Oct. 4, 1955 |
| 2,793,649 | Hamer | May 28, 1957 |

FOREIGN PATENTS

| | | |
|---|---|---|
| 18,175 | Great Britain | Aug. 13, 1906 |
| 16,483 | Great Britain | July 18, 1907 |